Figures 6, 7:
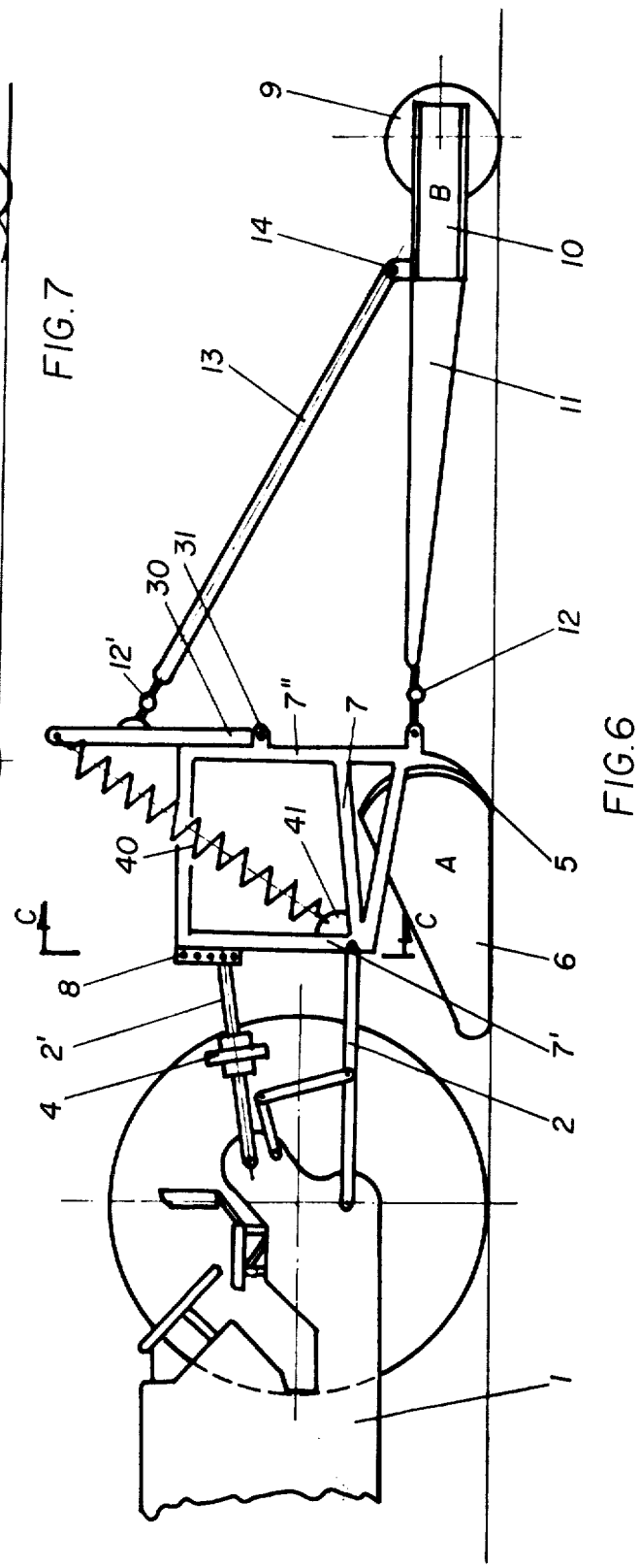

United States Patent
Manor

[11] 3,889,760
[45] June 17, 1975

[54] COMBINED SMOOTHER AND ROLLER-PACKER

[75] Inventor: Gedalyahu Manor, Haifa, Israel

[73] Assignees: Technion Research and Development Foundation, Ltd.; Aharon Kipnis, both of Haifa, Israel

[22] Filed: July 11, 1973

[21] Appl. No.: 311,428

[52] U.S. Cl. ............... 172/175; 172/239; 172/780
[51] Int. Cl. ............................................. A01b 49/02
[58] Field of Search ........... 172/780, 271, 195, 175, 172/170, 777, 451, 199, 138, 140, 235, 239, 261, 779, 264, 677, 117

[56] References Cited
UNITED STATES PATENTS

| | | | |
|---|---|---|---|
| 1,396,038 | 11/1921 | Ghent | 172/780 X |
| 2,747,489 | 5/1956 | Silver et al. | 172/270 |
| 3,090,141 | 5/1963 | Shumaker | 172/779 |
| 3,724,557 | 4/1973 | Boshung | 172/780 X |

*Primary Examiner*—Stephen C. Pellegrino
*Attorney, Agent, or Firm*—Flynn & Frishauf

[57] ABSTRACT

To permit simultaneous smoothing and packing of soil, a trailer assembly is provided in which a blade with side shields is connected by a three-point hitch to a tractor, and a roller-packer is pulled by the smoother with a draw bar. A rigid stiffening link is additionally provided to connect the smoother and roller-packer in fixed relationship, the rear end of the stiffening link being pivoted centrally to the roller frame, and the front end to the smoother by a universal pivot joint, with an intervening adjustable retaining force element, which can release to permit raising the smoother off the ground independently of the roller.

9 Claims, 9 Drawing Figures

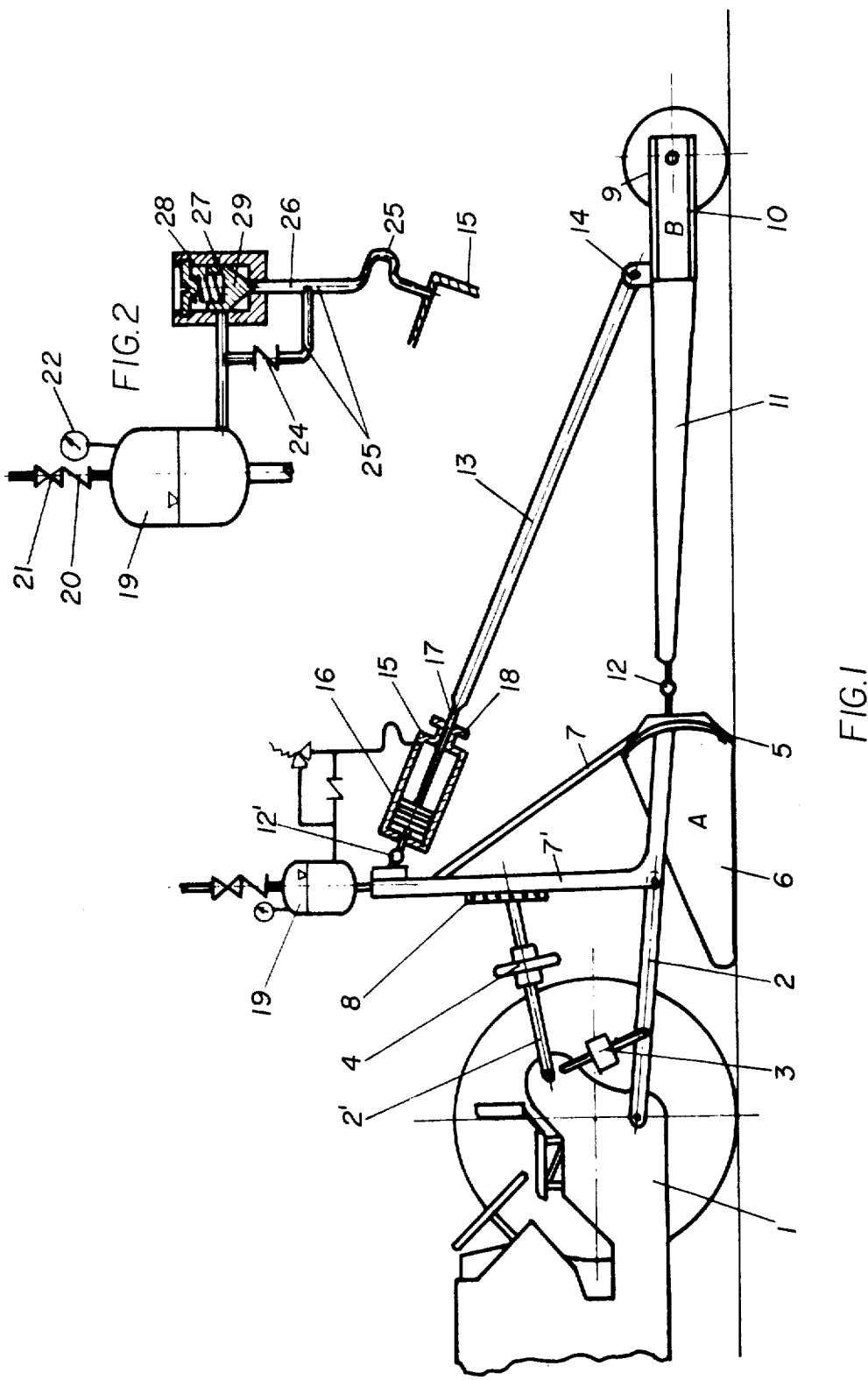

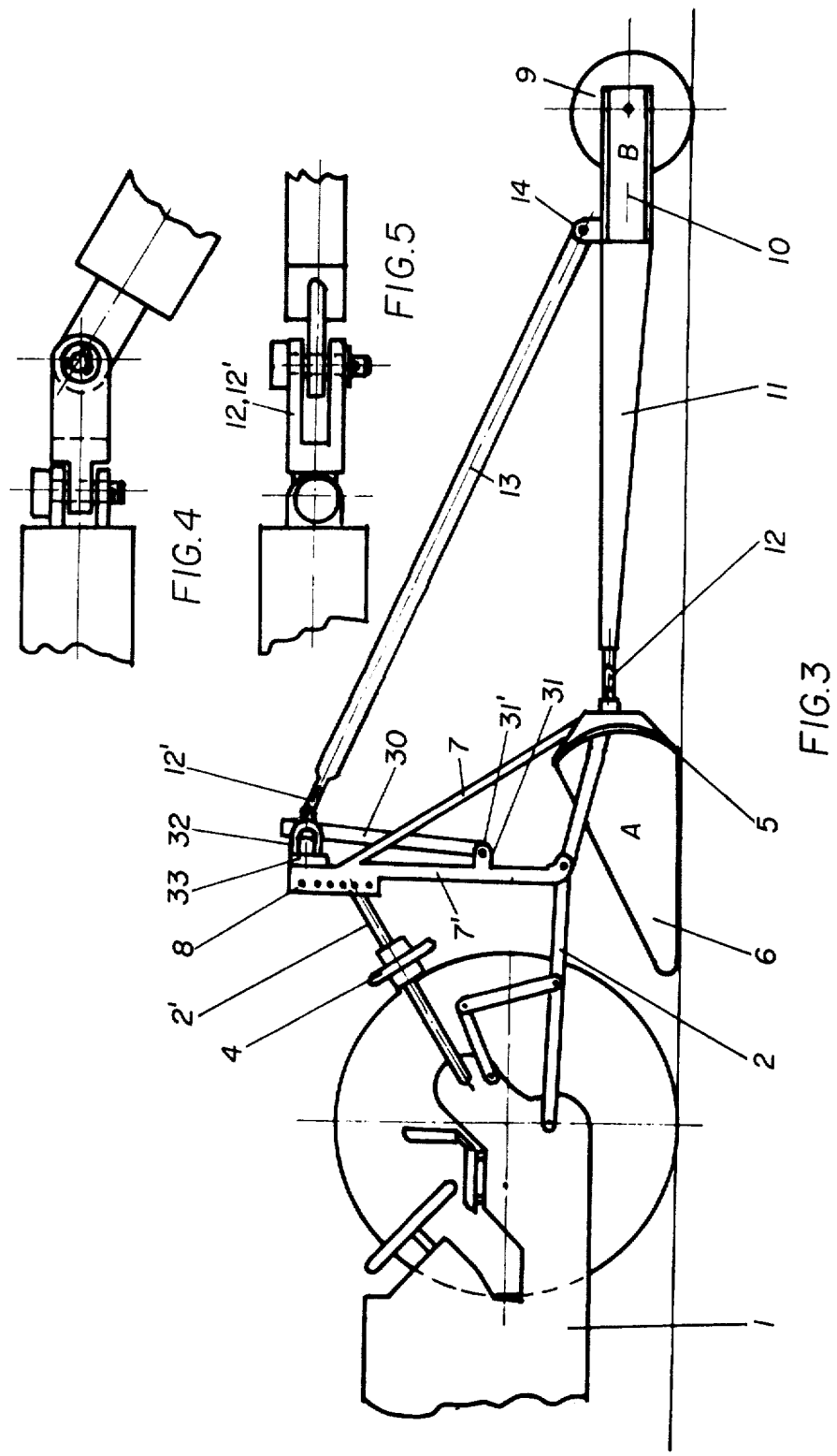

COMBINED SMOOTHER AND ROLLER-PACKER

The invention relates to an agricultural implement to be attached to a farm tractor by a three-point hitch, more especially to a combination of a smoother and a roller-packer.

In the relevant art the implement known as a smoother consists essentially of a curved blade drawn across the ground while held at a right angle to the direction of motion, which curved blade is provided at both ends with rigid side shields, and of a float connected by a rigid structure both to the blade at a certain distance behind and parallel to it and to the three-point hitch mechanism. The blade as well as the float and the supporting frame together form a light structure so as to enable them to be readily lifted off the ground for transport, by means of the hydraulic mechanism of the tractor.

For seed-bed preparation the smoother is usually followed by the implement known as a roller-packer, which consists of one or more horizontal rollers rotatably mounted in a frame and attached to a farm tractor by means of a draw-bar. The need for working the field twice over adds considerably to the expenses of soil preparation, and in order to economize, it has been proposed to let a roller-packer trail direct behind the smoother and thus to have it drawn by the same tractor. Not only does this make for a combined implement that is long and unwieldy, but the attached heavy mass of the roller is liable to upset the balance between the blade and the float, resulting in an uneven smoothing action; in addition the smoother can no longer be lifted by the three-point hitch linkage, unless the roller is detached beforehand, which poses the problem of transporting the roller-packer separately.

It is therefore the object of the present invention to combine a smoother-blade with a roller-packer in such a manner that the latter fulfils the task of the "float" used in the known smoother — while the blade can still be lifted off the ground for transport without the need for either lifting or disconnecting the heavy roller-packer, which continues to roll on the ground while trailed by the tractor. Another object of the invention is to enable the tractor driver to carry out the operation of the implement without leaving his seat.

In the following, the expressions "front" and "rear" will be used in the description of various parts of equipment, "front" denoting the direction of movement of the tractor and the attached implement during soil preparation and "rear" the opposite direction.

The invention consists of a tractor-drawn combined agricultural implement for the simultaneous smoothing and packing of the soil comprising (1) a smoother portion consisting of a blade with side shields, a supporting structure, and a three-point hitch linkage to the tractor, (2) a roller-packer portion consisting of a horizontal roller rotatably mounted in a frame, the front end of which frame is provided with a draw-bar the front end of which is connected through a universal pivot joint to a point on the supporting structure of the smoother substantially central with the smoother blade, (3) a rigid stiffening link for holding the smoother and the roller-packer portions in fixed mutual relationship, the rear end of which stiffening link is pivotally and centrally attached to the roller frame, while its front end is connected, through another universal pivot joint, to a point on the smoother support structure central in relation to the smoother blade and above and remote from the same, and (4) adjustable retaining force means interposed between the smoother and the roller-packer in any part of the stiffening link, which force means are adjusted so as to hold the roller and the smoother blade in a fixed mutual relationship during the normal working of the soil, and to release that firm connection upon a predetermined pulling force being applied to said force means, allowing the smoother alone to be raised off the ground.

The retaining force means acting between the stiffening link and the smoother may be in the form of a permanent magnet in contact with an armature, a fluid under pressure acting on a piston in a cylinder, steel springs under tension, or the like devices.

In a preferred embodiment the front end of the stiffening link is pivotally connected to a lever capable of swivelling rearwards about a fulcrum pin integral with the smoother structure upon the stiffening link's exerting a pull whenever the smoother is being lifted. In normal working conditions said lever is in an upright position, while the said force means are applied to the upper part of the lever in a direction counter to said pull and so adjusted as to tip the lever backwards upon a predetermined pull.

When a permanent magnet is used as the retaining force means, resistance to the lifting of the smoother — except for its weight — ceases as soon as the magnet is separated from the armature while the roller remains on the ground. When tension springs constitute the retaining force means, the force actually exerted increases with the elongation of the spring, and for this reason the rear-ends of the springs are attached to the top of the lever while the front ends are fastened to the front of the smoother structure at a low point thereof, so that the spring or springs form an acute angle with the direction of the lever. Therefore, as the swivel angle of the lever increases, the resultant horizontal force gradually decreases becoming zero when the springs and the lever are in line.

Similarly, a hydraulic system, consisting essentially of a cylinder and a piston may be attached to the lever, pulling it forward into the upright position; it may however, be advantageous to dispense with the lever altogether and to insert the hydraulic cylinder and piston coaxially into the stiffening link and so to enable the distance between the hinged ends of this link to be increased, which changes the configuration of the constituent parts of the implement.

Figure 8:
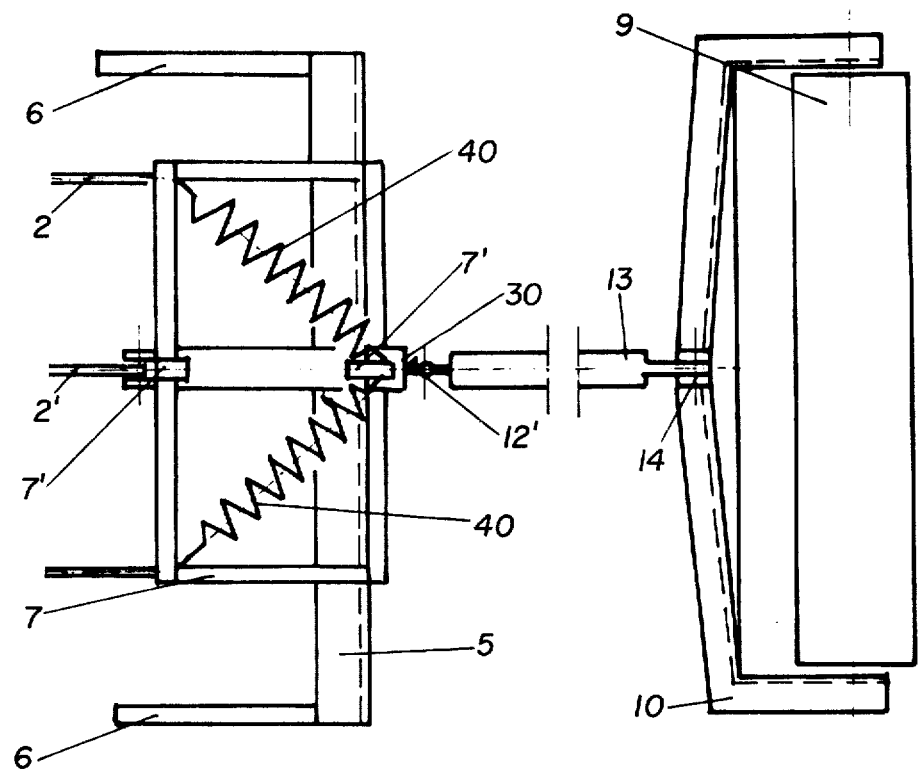
Figure 9:
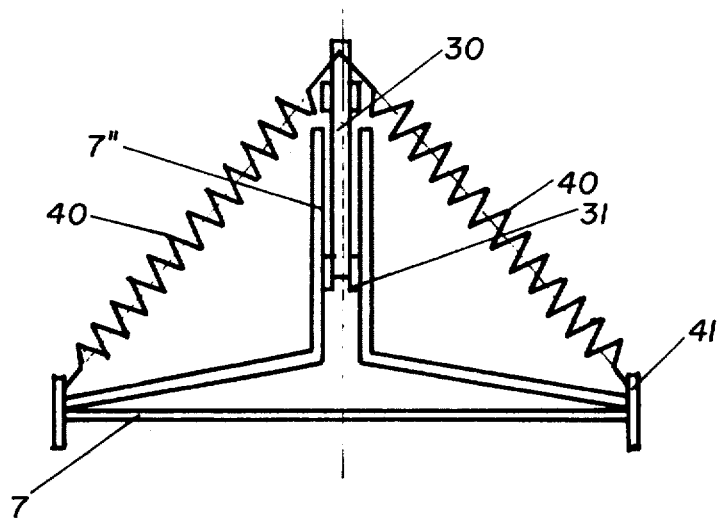

In the accompanying drawings, which illustrate various embodiments of the invention and wherein identical numbers are utilized to indicate like or similar parts, FIG. 1 is a side view of the implement with a hydraulic fluid mechanism serving as retaining force means, FIG. 2 is a detail of the hydraulic controls appearing in FIG. 1, FIG. 3 is a side view of the implement with a permanent magnet serving as retaining force means, FIG. 4 shows, in detail, the universal joint indicated in FIG. 3, FIG. 5 is a view from above of the universal joint shown in FIG. 4, FIG. 6 is a side view of the implement with two tension springs serving as the retaining force means, FIG. 7 is a diagram showing two positions of the constituent parts and the resulting forces, FIG. 8 is a view from above of the embodiment shown in FIG. 5, and FIG. 9 is a section along C—C in FIG. 6.

With reference to the drawings, which all show the same implement but with different retaining force means and the structural differences resulting therefrom, a farm tractor 1 is connected to the implement by the three-point linkage 2 which also serves to lift the equipment by means of hydraulic power cylinders 3. The top link 2' is adjustable by means of a handwheel 4, permiting the blade to be raised or lowered as required. The implement consists of a smoother A attached to the tractor 1 by the said linkage 2 and a roller-packer B. The smoother consists of a smoother blade 5 provided with side shields 6 and a rigid supporting structure 7, with a strong upright centre mast 7'. This mast serves for the adjustment of the implement's position by attaching the top link 2' to anyone of a row of holes 8 adapted for receiving a connecting pin. It also serves for the attachment of the front end of the stiffening link, the rear end of which holds the roller packer in position, as will be described hereinafter.

The roller-packer B has a roller 9 rotatably mounted in a frame 10 which is provided with a central draw-bar 11 extending to the front of the implement and connected to the centre of the smoother blade by way of a universal pivot joint 12, such as a ball joint, a "Cardan" universal joint, or the like. In order to keep the smoother and the roller in rigid relationship they are connected to each other by a stiffening link 13 the rear end of which is hingedly attached to the centre of the roller frame by means of a pin and lugs 14. This stiffening link is preferably provided with length-adjusting means — not shown in the drawing — so as to permit the exact setting-up of the equipment for effective working. The connection between the stiffening link and the smoother structure is different for the several embodiments and will be specifically described with reference to each FIGURE.

The retaining force means used in the implement shown in FIG. 1 consist of a hydraulic cylinder 15 inside which a close-fitting piston 16 is free to move. The piston is firmly connected to a piston rod 17 which forms a coaxial extension of the stiffening link 13. A fluid seal 18 on the cylinder end wall prevents fluid from escaping along the piston rod. The cylinder is pivotally attached to the upper part of the centre post 7' by means of a universal pivot joint 12' such as, for instance, a ball joint capable of transferring tension forces.

The rear end of the cylinder is filled with a pressure fluid, e.g. oil, which presses on the piston in a forward direction until a fixed stop is reached, thus defining the length of the stiffening link and the relative positions of smoother and roller. The fluid is supplied to the cylinder from a pressure vessel 19 (v.FIG. 2) which is about half-filled with fluid, compressed air filling the upper half. At its top the pressure vessel is fitted with an opening for filling, closed by a checkvalve 20 and a stopvalve 21. A pressure gauge 22 is also provided.

Coming from the pressure vessel, the fluid enters the cylinder through a pipe 23, into which a check valve 24 is inserted to prevent a return flow from the cylinder to the vessel. The pipe 23 is connected to the cylinder inlet via a length of pressure-resistant hose 25 to permit the angular movement of the cylinder together with the stiffening link. Across the check-valve 24 a pressure relief valve of known design is shunted through pipes 26 and 26'. The pressure relief valve is adjusted by means of an internal spring 28 to open upon a predetermined fluid pressure acting on its piston 29.

The equipment described above functions as follows: After the constituent parts have been aligned by the adjustment of the length of both the top link 2' and the stiffening link 13, the implement is drawn to the field to be worked, with the smoother in the raised position. The tractor is then driven onto the field, and as the implement crosses the edge thereof the smoother blade is lowered into the working position so that, as it is drawn across the field by the continued progress of the tractor, raised portion of the underlying soil are smoothed and depressions filled in. The soil thus provisionally and roughly smoothed and levelled is compacted during the same pass of the tractor-implement combination by the action of the built-in roller-packer following behind the smoother blade. As the smoother is lowered into the working position, the piston 16 slides forward and creates a vacuum in the rear part of the cylinder; this opens the check valve 24, and the cylinder fills with fluid. Under normal working conditions the fluid cannot escape from the cylinder due to the check-valve 24 and the pressure relief valve 27, the length of the stiffening link thus remains effectively unchanged, and the smoother and roller are kept in the desired rigid relationship. However, when the smoother A meets a high obstruction in the soil over which it has to climb, or should the tractor driver lift the smoother blade 5 by actuating the hydraulic cylinders 3 on the links 2, then the weight of the roller packer B forces the piston 16 in a rearward direction, therby increasing the pressure inside the cylinder 15 beyond that to which the relief valve has been previously set. The relief valve opens, letting the fluid return to the pressure vessel 19. As soon as the relative movement of the smoother A and the roller 9 of packer B ceases, e.g. after the obstacle has been climbed or the smoother is left by the driver in the raised position, the pressure inside the cylinder 15 subsides, the relief valve closes, and the stiffening link remains rigidly in its extended position until the smoother is lowered again, either by its own weight after clearing the obstacle or by the appropriate action on the part of the driver. In that case the returning piston 16 causes the check-valve 24 to open and the cycle continues as described hereinbefore.

The equipment shown in FIGS. 3, 4 and 5 is similar to that shown in FIG. 1, differing mainly in respect of the retaining force means and by the provision of the universal joints 12 and 12' — the latter shown in detail in FIGS. 4 and 5. In this embodiment the front end of the stiffening link is attached to the upper end of an upright arm 30 via a universal joint 12'; the lower end of the arm 30 is hingedly connected to the smoother structure by means of lugs 31 and a pin 31', permitting its oscillating movement in the centre plane of the smoother. A permanent horseshoe magnet 32 is rigidly fastened to the arm 30 in such a way that both its poles point towards the front and are in contact with an armature 33 when the arm 30 is in the highest position. In that position the magnetic forces acting on the armature hold the stiffening link and, through the rear connecting point 14, the roller-packer in fixed position. The magnet will be chosen in consideration of the force required to hold the smoother and roller in fixed relationship under normal conditions, and of that pull exerted by the roller by way of the stiffening link which is sufficient to sever the connection between the magnet and armature. The magnetic forces act only as long as the magnet and the armature are in close contact or proximity; as soon as the magnet is separated from the armature by the smoother being lifted off the ground, the only vertical resultant force acting on the three-point hitch linkage is the weight of the smoother. This enables the smoother to be readily lifted for transport, with the roller trailing behind; when the smoother is again lowered to the ground, the magnet returns into the position of contact with the armature, and the two parts of the equipment are once again held in fixed relationship through the rigid stiffening link.

A number of modifications may be made with respect to this embodiment: for instance, a flat magnet may be fitted instead of the horse-shoe magnet shown, or the magnet may be fastened to the head of the centre mast and the armature attached to the arm, or more than one magnet may be attached to either component. The universal joints may be of the ball type, and there may be other structural alterations which are not shown in the drawings.

In the embodiments shown in FIGS. 7, 8, and 9, the retaining force holding the stiffening link is provided by two diagonally placed helical springs 40 with their top ends attached to an upright arm 30 which is similar to that illustrated in FIG. 3. This arm is fastened to an upright mast 7" rising direct above the smoother blade, behind and in parallel with the mast 7' shown and illustrated in respect of the previous embodiments, resulting in a shorter stiffening link. This arrangement, although resulting in a heavier supporting structure 7, is made necessary by the need to find supporting points for the lower ends of the springs which are fastened to two lugs 41 in the two lower front corners of the structure. Instead of the lugs 41 the springs may be fastened to two adjustable bolts attached to the structure. The remaining parts of the implement are substantially the same as those shown in FIG. 3.

The functioning of this embodiment is similar to that previously described, the main difference being that the retaining force does not cease abruptly but decreases gradually from maximum value to nil. This is demonstrated in the diagrammatic drawing of FIG. 7 which shows two positions of the lever 30 and their resulting forces acting on the stiffening link. The full lines denote the equipment in working condition, the broken lines designate the position of the same parts with the smoother raised. The force $F_1$ of the spring results in a force $F_2$ in the stiffening link; when the smoother is lifted, the angle between the springs and the arm 30 has been reduced to a very small value, and although the force $F_1'$ of the extended spring is greater than before, the resultant force $F_2'$ is much smaller. By a judicious choice of the proportions of the structure, the arm, the loci of attachment, etc., the resultant forces can be made as large or as small as the case requires.

In addition to the embodiments shown hereinbefore other variations may be incorporated by a person skilled in the art without thereby departing from the essence of the invention, which is defined by the following claims.

I claim:

1. A tractor-drawn agricultural implement for the simultaneous smoothing and packing of soil comprising a smoother (A) having a blade (5), side shields (6), a supporting structure (7), and a three-point hitch linkage (2, 2', 4) to a tractor (5);

a roller-packer (B) having a frame (10), a horizontal roller (9) rotatably arranged in the frame, a drawbar (11), and a universal joint (12) at its front end, the universal pivot joint connecting to a point substantially central with respect to the smoother blade (5);

a rigid stiffening link (13) pivoted at both ends for holding the smoother (A) and the roller-packer (B) in fixed relationship, the pivot (14) at its rear end being centrally attached to the roller frame (10), and the pivot (12') at its front end including a universal pivot joint, connected to a point on the smoother (A), central in relation to, above and remote from, the smoother blade (5);

and adjustable retaining force means interposed between the smoother (A) and the roller-packer (B) in any portion of the stiffening link (13), which force means are adjusted to hold the roller and the smoother blade in fixed relationship during normal working of the soil, and to break the said fixed relationship upon a predetermined tractive force acting on said force means, permitting the smoother blade (5) to be raised independently of vertical movement of the roller (9) of the roller-packer (B).

2. An agricultural implement as claimed in claim 1 wherein the front end of the stiffening link (13) is pivotally connected to the upper part of a guide link in the shape of an arm (30) which is in an upright position during normal working conditions, and capable to swivel rearwards about a fulcrum pin (31, 31') integral with the smoother structure, upon the pull of the stiffening link, said force means being applied to the upper part of the arm (30) in counterdirection to said pull and so adjusted as to release the arm upon a predetermined force.

3. An agricultural implement as claimed in claim 1 wherein the force means comprises a permanent magnet (32) and an armature (33), one of which (33) is attached to the smoother structure (A; 7'), while the other (32) is connected to the stiffening link (13).

4. An agricultural implement as claimed in claim 1 wherein the retaining force means comprise a hydraulic cylinder (15) with a tightly fitting piston (16) movable therein, the cylinder being attached to the smoother (A) by means of a universal joint (12'), while the piston (16) is rigidly and co-axially connected to the stiffening link (13).

5. In an agricultural implement as claimed in claim 4, a fluid under pressure filling the rear end of the cylinder (15), release means being provided in the form of a pressure relief valve (27) connected to the pressure side of the cylinder (15) and adjusted so as to allow fluid to escape from the cylinder upon a predetermined pressure resulting therein from a pulling force exerted by the stiffening link.

6. An agricultural implement as claimed in claim 1, wherein the adjustable retaining force means comprises one or more helical tension springs (40), an upright arm (30) on the smoother (A), the springs (40) being connected at their upper, rear end to the head of said arm (30) and at their bottom, front end to a lower part (41) of the smoother structure (A).

7. An agricultural implement as claimed in claim 1, wherein the pivot (12') at the front end of the stiffening link (13) to the frame end is directly connected to the smoother (A).

8. An agricultural implement as claimed in claim 1, wherein a guide link (30) is provided, and the pivot (12') at the front end of the stiffening link (13) and the smoother (A) are connected by said guide link (30).

9. An agricultural implement as claimed in claim 6, further comprising an essentially parallelogram connection (7, 7', 7'') included in the hitch linkage to the tractor (5), said upright arm (30) being connected to said parallelogram connection whereby, upon upward movement of the smoother (A), the upright arm will remain in essentially vertical position, the bottom, front ends of said springs (40) being connected to a lower part (41) of said parallelogram connection, said arm extending above said parallelogram connection to change the angle between said springs (40) and said arm, upon raising of said smoother (A) and hence said parallelogram connection, and thereby change the application of force by said springs on said stiffening link (13).

* * * * *